Figure 1:
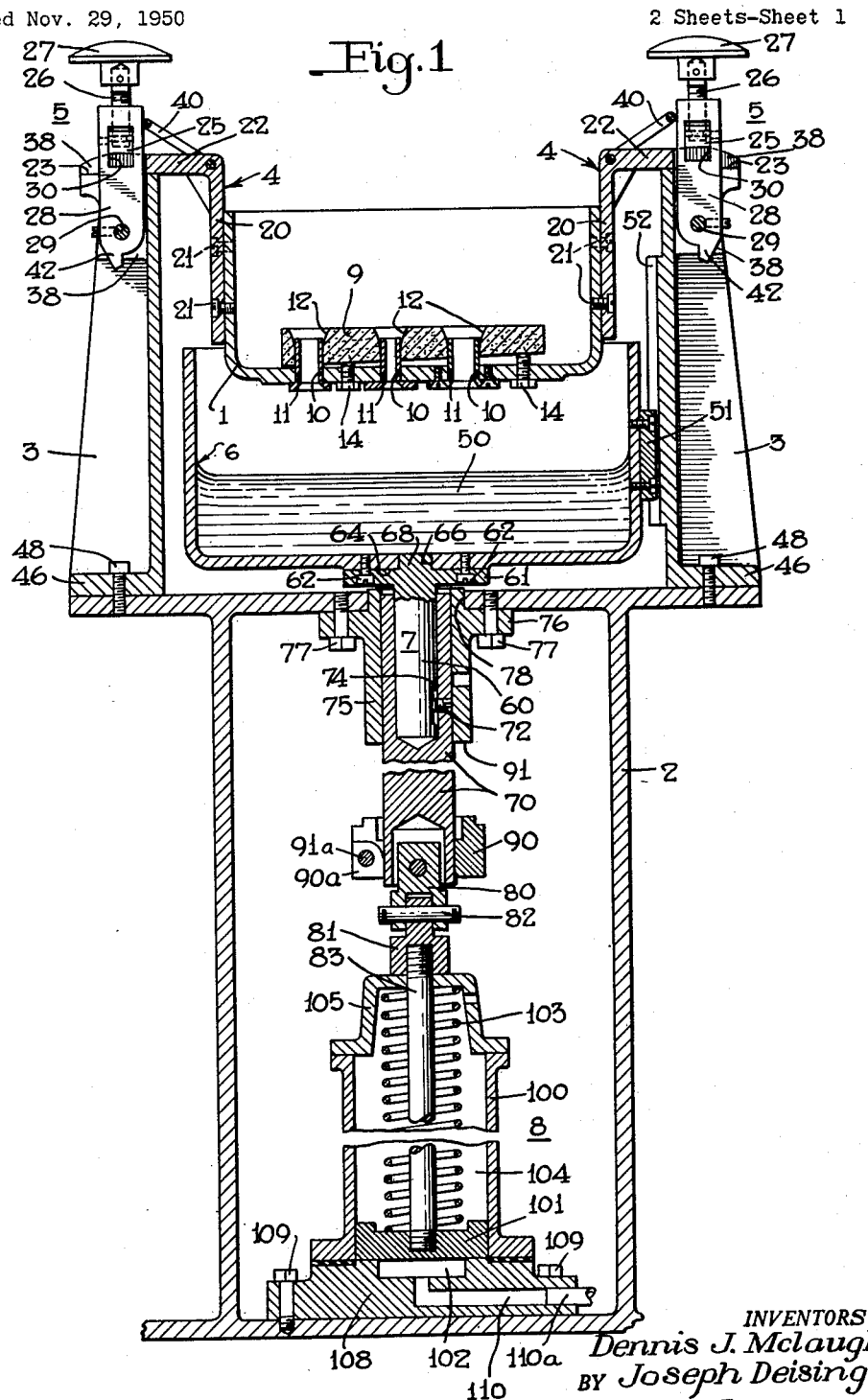

April 20, 1954     D. J. McLAUGHLIN ET AL     2,675,780
CORE PASTING APPARATUS

Filed Nov. 29, 1950     2 Sheets-Sheet 1

INVENTORS
Dennis J. McLaughlin
BY Joseph Deisinger
Frank E. Miller
ATTORNEY

April 20, 1954  D. J. McLAUGHLIN ET AL  2,675,780
CORE PASTING APPARATUS
Filed Nov. 29, 1950  2 Sheets-Sheet 2
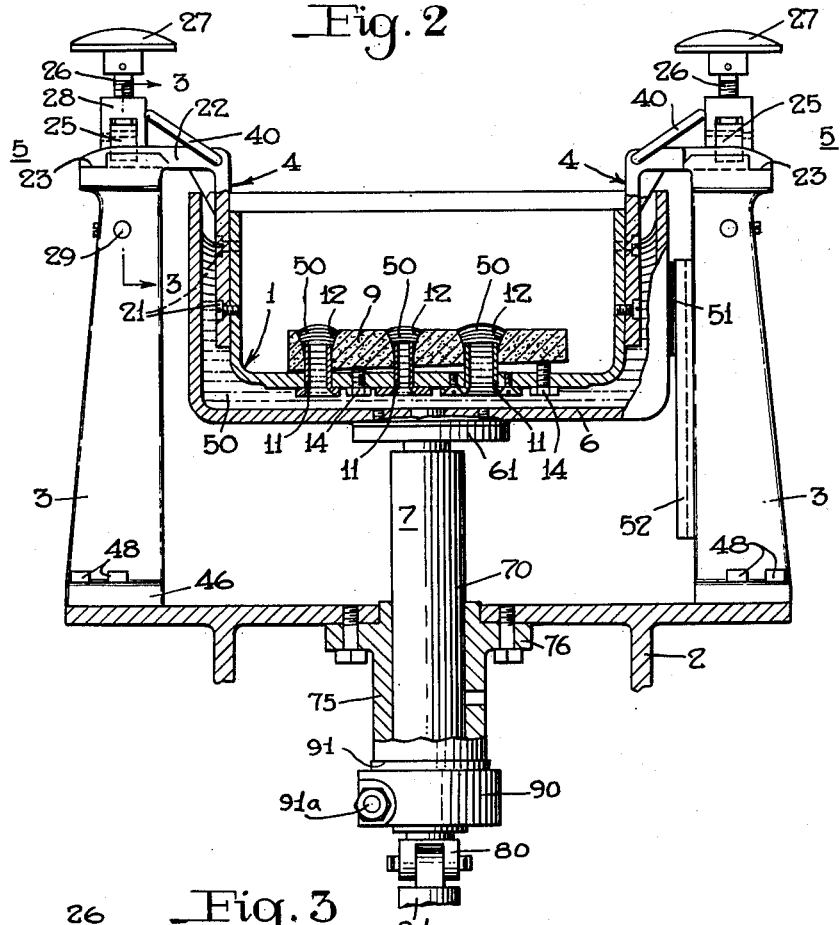
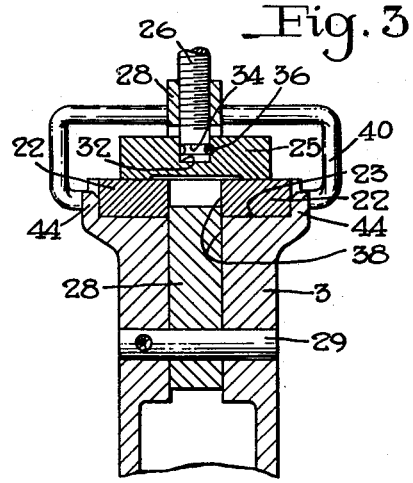
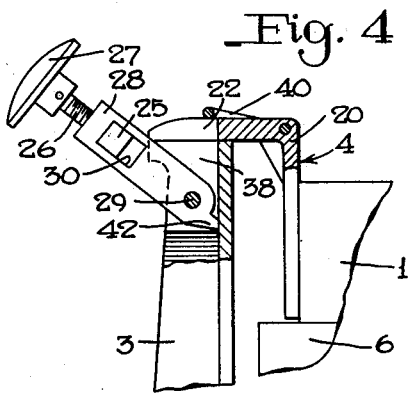
INVENTORS
Dennis J. McLaughlin
BY Joseph Deisinger
Frank E. Miller
ATTORNEY Patented Apr. 20, 1954

2,675,780

UNITED STATES PATENT OFFICE 2,675,780

CORE PASTING APPARATUS

Dennis J. McLaughlin, Irwin, and Joseph Deisinger, Pitcairn, Pa., assignors to Westinghouse Air Brake Company, a corporation of Pennsylvania Application November 29, 1950, Serial No. 198,074

2 Claims. (Cl. 118—406)

This invention relates to core pasting apparatus and more particularly to apparatus for pasting core print holes in cake cores for a core assemblage.

It has been the practice when assembling core units into a main core assemblage, to apply core paste to each of a plurality of core print holes in a cake core by hand, with the aid of a small spatula or the like, preparatory to introducing the various core units to such holes; the function of the core paste being to retain such core units within the respective core print holes and thereby assure that the core assemblage will remain intact.

Such manual application of core paste as above described is necessarily tedious due to the number and relatively small size of the core print holes into which a small spatula or trowel must be inserted to introduce such paste in the proper amount.

In view of the preceding, it is a prime object of the invention to provide apparatus which will effect such core posting mechanically, applying the proper amount of paste in the proper location simultaneously in each core print hole of a cake core, with consequent saving in time, labor and expense.

The above object is attained in the present invention, by providing a cake core receptacle and a core paste receptacle movably mounted under the core receptacle, the two receptacles being of such size as to allow the paste receptacle to fit with clearance around the core receptacle. The cake core receptacle is open at the top to allow for placing a cake core over a plurality of nozzles which open upwardly from the bottom of the core receptacle for projection into the various core print holes, respectively, formed in the cake core. The paste receptacle also is open at the top to allow for make-up and addition of core paste which it carries and to allow it to fit around the cake core receptacle. Motor means are provided for effecting movement of the two receptacles, one relative to the other, to bring the core paste into contact with the underside of the core receptacle and the feeding of such paste upward through the nozzles into the respective core print holes, depositing the proper amount of paste simultaneously on the walls of all such holes.

Other objects and advantages will become apparent from the following more detailed description of the invention taken in connection with the accompanying drawings, in which Fig. 1 is a schematic cross-sectional view of core pasting apparatus embodying the invention; Fig. 2 is a schematic view, partly in outline and partly in section, of a portion of the core pasting apparatus in a position other than that in which such portion is shown in Fig. 1; Fig. 3 is a cross-sectional view taken along the line 3—3 in Fig. 2 showing details of a cake-core-receptacle-support clamping means employed in the core pasting apparatus; and Fig. 4 is a schematic view, partly in outline and partly in section, showing the support clamping means in an unlocked repose position.

Description

Referring to Fig. 1 in the drawings, the core pasting apparatus embodying the invention comprises a core receptacle 1 which is secured in a fixed raised position above an enclosed table 2 by means of attached brackets 4, two spaced-apart pedestals 3, and respective clamping means 5 associated therewith. The apparatus further comprises a core paste receptacle 6 disposed beneath the core receptacle and centrally attached to a reciprocable connecting means 7 which is operably connected to motor means 8 for raising the paste receptacle 6 toward the core receptacle 1.

The core receptacle 1 may be formed in any convenient fashion such that it is open at the top to allow for facile insertion and removal of sand cake cores for foundry use. According to a feature of the invention, the bottom of the core receptacle, on or adjacent to which bottom a cake core 9 to be pasted is placed, is provided with a plurality of openings 10 into which nozzles 11 may be inserted and fixed for projection into the lower open ends of the respective core print holes 12 extending vertically into the core 9. The size and number of the openings 10 and nozzles 11 corresponds to the size and number of the core print holes 12 in the particular cake core being processed. To allow the cake core to be slipped upwardly over and thereby removed from the nozzles 11, it is necessary that such nozzles be substantially perpendicular to the bottom of the receptacle 1. In the case of a cake core, such as core 9 illustrated, the bottom of which is tapered, adjustable core rests 14 are provided which project upwardly from the bottom of the core receptacle 1 for engagement with the tapered bottom of the core to assure verticality of the core print holes 12 in such core, so that same may fit over the perpendicular nozzles 11.

The core print holes 12 are usually round, and the nozzles 11 are therefore usually round to fit such holes; however, the shape of the nozzles are made to conform to the shape of the core print holes, which holes may be square or some other shape.

The nozzles 11 are rounded at their inlet end on the under side of the core receptacle to facilitate entrance of core paste and are of such length at their opposite projecting outlet end to only partially penetrate the core print holes 12 in the core fitted over them, so as to allow for accumulation of paste above the nozzle and within the holes, which paste upon removal of the core from the receptacle 1 will flow downwardly into the holes 12 and coat the walls thereof for substantially their entire length.

Each of the brackets 4 comprises a vertical leg 20 which is removably attached to a respective side of the core receptacle 1 by means of machine screws 21. Each of the vertical legs 20 extends above the upper rim of the core receptacle 1 and joins a horizontal member 22 adapted to seat on a respective accommodating horizontal surface 23 formed in the upper end of the respective pedestal 3. Such extension of the vertical legs 20 above the upper rim of the core receptacle 1 allows sufficient travel of the paste receptacle 6 to assume its raised position, in which it is shown in Fig. 2, and in which the core receptacle is surrounded by the paste receptacle for reasons which will hereinafter become obvious.

Referring to Figs. 1 and 3, each clamping means 5 comprises a bar 25 which is urged against the upper surface of the horizontal member 22 of the respective bracket 4 to hold said member seated on the surface 23 atop the respective pedestal 3. Each bar 25 is carried on one end of a feed-screw element 26 to the opposite end of which is attached a knob 27 for turning same. The feed-screw element 26 extends through a threaded opening in one end of a rigid element 28 which is pivotally connected by means of a pin 29 to the pedestal 3. Turning movement of the screw element 26 in opposite directions, as effected manually by means of the knob 27, will cause movement of the screw element relative to element 28 for tightening and loosening the bar 25 on the respective member 22. The bar 25 is slidably guided for such tightening and loosening movement by slidable engagement with the walls of a rectangular through opening 30 in element 28, which guiding action of the bar prevents same from turning with the screw element 26. To accommodate such action, the bar 25 is provided with a socket 32 into which the end of the screw element 26 rotatably fits. To prevent the bar 25 from slipping off the end of the screw element 26 when turned loose of the respective member 22, an annular groove 34 is provided in the end of the screw element which fits into the socket 32, a small bore is provided which opens transversely through the bar 25 at a tangent to the socket 32 in alignment with the groove 34 to accommodate a locking pin 36, which pin may be inserted through the bore into engagement with the end of the screw element within the groove. Tangential contact of the pin 36 with the screw element within the groove 34 allows the screw element to turn relative to the bar and the pin simply rides in the groove, but engagement of the pin with the annular recessed shoulder formed by the groove prevents parting of screw element and bar.

The member 22 and pedestal 3 are divided to form a continuous slot 38 within which the element 28 may rock on pin 29 to a repose position in which it is shown in Fig. 4, with the member 22 free of the bar 25, to allow the core receptacle to be lifted via respective pivotal handles 40 off the pedestals 3. A stop lug 42 attached to the lowermost end of a respective element 28 is provided for engagement with a connecting wall of the pedestal 3 to define the repose position of the locking means such that same may readily be moved to locking position for clamping respective members 22 to the pedestals. Upwardly projecting spaced apart ribs 44 formed in the upper end of each pedestal 3 at opposite sides of the respective surfaces 23 allows for location of the respective members 22 when placed on such surfaces upon replacing the core receptacle 1.

Each of the pedestals 3 is provided with a base pad 46 for mounting on the top of table 2 and is secured thereto by means such as machine screws 48.

The paste receptacle 6 for storing core paste 50 and transporting same to the underside of the core receptacle 1 is open at the top and of such size that in repose position, in which it is shown in Fig. 1, it fits around the core receptacle with sufficient clearance to allow for periodic addition of quantities of core paste to maintain the paste receptacle such as one-third to one-half full, for example.

According to a main feature of the invention, the paste receptacle 6 is adapted to be raised to a position in which it is shown in Fig. 2 surrounding the core receptacle 1. The paste 50 is thus caused to come in contact with the underside of the core receptacle and to rise to a height around the sides of the core receptacle sufficiently greater than the elevation of the cake core 9 in the bottom of the cake core receptacle, that the static head which is thereby created will be sufficient to cause the core paste 50 to enter the nozzles 11 and flow upward therethrough into the top of the respective core print holes 12 in the cake core 9. Subsequent return of the paste receptacle 6 to its repose position beneath the core receptacle 1 will allow the major portion of the paste to leave the core receptacle while a desired amount is retained by adhesion to the upper portion on the walls of the core print holes 12 in the cake core 9 which paste, upon removal of the core 9 from receptacle 1, will flow downwardly to substantially coat the entire surface of said holes. Subsequent insertion of the core prints (not shown) inserted into the holes 12 assures even distribution of the paste 50 for pasting these core prints in place, after which the assemblage is baked to properly harden or condition the paste.

A lug 51 removably attached to one side of the paste receptacle 6 slidably engages the vertical sidewalls 52 of a groove formed in a respective one of the pedestals 3 to prevent turning movement of the receptacle when being raised.

The connecting means 7 for joining the paste receptacle 6 to the motor means 8 comprises a shaft 60 which is provided with an annular flange 61 at one end, which flange is removably attached by means of machine screws 62 to a central annular shoulder 64 formed in the under side of the paste receptacle. A central opening 66 through the bottom of the receptacle 6 accommodates a projecting portion 68 encircled by the flange 61 of the shaft 60 to accurately locate said flange on shoulder 64 and aid in alignment of the openings which accommodate the machine screws 62. The shaft 60 is telescoped in the hollow end of a larger shaft 70 connected to the motor means 8, and, as will be appreciated from subsequent description, the lowermost repose position of the shaft 70 is fixed. To allow for adjustment in height of the repose position of the paste receptable 6 above the table, the shaft 60 may be moved short distances inwardly and outwardly of the shaft 70 by tightening and loosening a set screw 72 which is in screw-threaded engagement with shaft 70.

A groove 74 formed in the shaft 60 accommodates the projecting end of the set screw 72 and the ends of said groove determine the extent of adjustment of the shaft 60 relative to the shaft 70.

The shaft 70 is slidably guided for vertical movement relative to the table 2 by a sleeve 75 which is provided with an outwardly projecting radial flange 76 adjacent to one end for securing to the table by means of machine screws 77. A projecting portion of the sleeve 75 is provided to fit a central opening 78 in the table top to locate the sleeve relative thereto.

The lowermost end of the shaft 70 is provided with a clevis 80 connected to a lug 81 by means of a pin 82, which lug is in turn in screw-threaded attachment to the uppermost end of a piston rod 83 comprised in the motor means 8 through the medium of which the rod 70, hence paste receptacle 6, are raised.

An adjustable stop collar 90 is provided on the rod 70 for engagement with an annular stop shoulder 91, in which it is shown in Fig. 2, formed by the lowermost end of sleeve 75 secured to the table to limit upward movement of the rod 70 and thereby define the raised position of the paste receptacle relative to the core receptacle. The collar 90 has a slidable fit around the outer periphery of the rod 70 and is provided with a radial through saw-cut 90a to enable the collar to be tightened and loosened from shaft 70 by screwing and unscrewing, respectively, a machine screw 91a extending between the sections of the collar divided by the saw-cut.

The motor means 8 for actuating the paste receptacle, for sake of illustration, may comprise a hollow cylindrical casing 100 having a piston 101 slidably disposed therein and subject opposingly to pressure of fluid in a pressure chamber 102 at one side and to force of a piston return spring 103 disposed in a non-pressure chamber 104 at its opposite side. The piston 101 is operatively connected to the piston rod 83. A non-pressure head 105 closes one end of the casing 100, defining an end wall of the non-pressure chamber 104 and serving as abutting means for one end of the return spring 103, and acting as a guide for reciprocable movement of the piston rod 83. A pressure head 108 closes the opposite end of the casing 100, defining an end wall of the pressure chamber 102, and serving as a mount for the motor means as attached by means such as screws 109 to the enclosed table 2. The pressure head 108 is provided with a fluid pressure supply passage 110, connected at one end to the pressure chamber 102 and at its opposite end to a fluid pressure control pipe 110a, for conveying fluid under pressure to and from said pressure chamber 102 to effect reciprocable movement of the piston 101 and thereby rods 83 and 70 for raising and lowering the paste receptacle 6 to effect the pasting operation hereinbefore described.

Summary

It will now be appreciated that I have provided apparatus for mechanically applying the proper amount of core paste to a plurality of core print holes of a cake core in a single operation, which apparatus is simply effected by such as supply of fluid under pressure to fluid pressure motor means.

Having now described our invention, what we claim as new and desire to secure by Letters Patent, is:

1. Apparatus for pasting different sized core print holes in a cake core, comprising a cake core receptacle opening upwardly and having a bottom provided with through openings for registry with the core print holes, a plurality of correspondingly sized nozzles projecting vertically from said bottom for disposition of their upper ends within said core print holes and open at their lower ends to said openings, respectively, a paste receptacle opening upwardly and disposed beneath said core receptacle, the horizontal dimension of said paste receptacle being greater than the corresponding dimensions of said core receptacle, and motor means for effecting relative vertical movement between the two receptacles to cause the bottom of said core receptacle to be submerged in the paste within said paste receptacle to cause upward flow of said paste through said nozzles.

2. Apparatus for pasting different sized core print holes in a cake core, comprising a rigid table, a core receptacle spaced above said table opening upwardly and having a bottom provided with through openings spaced for coincidence with said core print holes, a plurality of correspondingly sized nozzles projecting vertically from said bottom for disposition of their upper ends within said core print holes and open at their lower ends to said openings, respectively, a pair of brackets attached oppositely to said core receptacle, a pair of spaced apart pedestals rigidly secured to said table and disposed with clearance at opposite sides of said core receptacle in supporting engagement with said brackets, respectively, respective releasable clamping means cooperable with said pedestals and with said brackets to assure said supporting engagement, a paste receptacle opening upwardly and disposed above said table beneath said core receptacle, the horizontal dimensions of said paste receptacle being greater than corresponding dimensions of said core receptacle to allow the former to be surrounded by the latter, a vertical rod attached at its uppermost end centrally to the underside of said paste receptacle and extending downward through an opening in the top of said table, bushing means attached to said table projecting vertically downward in slidable guiding engagement with said rod, a fluid pressure motor operatively connected to said rod for effecting vertical movement of same and thereby said paste receptacle to a raised position in which said paste receptacle substantially surrounds said core receptacle to cause the bottom of said core receptacle to displace paste in said paste receptacle vertically between the two receptacles to a height above the upper ends of said core print holes for forcing paste upwardly through said nozzles to said upper ends, and collar means associated with said rod for abutment with the lowermost projecting end of said bushing means to determine the extent of said vertical movement, said collar means being adjustable axially of said rod to vary travel of said paste receptacle for assuring proper displacement of paste according to the volume of same contained in said paste receptacle.

References Cited in the file of this patent
UNITED STATES PATENTS

| Number | Name | Date |
|---|---|---|
| 1,260,928 | McNeil | Mar. 26, 1918 |
| 2,008,780 | Bazzoni | July 23, 1935 |
| 2,059,339 | Green | Nov. 3, 1936 |
| 2,102,819 | Ronci | Dec. 21, 1937 |
| 2,143,408 | Clark | Jan. 10, 1939 |
| 2,182,364 | Smith | Dec. 5, 1939 |